(12) United States Patent
Abe

(10) Patent No.: US 6,747,370 B2
(45) Date of Patent: Jun. 8, 2004

(54) HIGH-TEMPERATURE SECONDARY BATTERY BASED ENERGY STORAGE AND POWER COMPENSATION SYSTEM

(75) Inventor: Hiroyuki Abe, Nagoya (JP)

(73) Assignees: NGK Insulators, Ltd., Nagoya (JP); The Tokyo Electric Power Company, Incorporated, Tokyo (JP)

( * ) Notice: Subject to any disclaimer, the term of this patent is extended or adjusted under 35 U.S.C. 154(b) by 447 days.

(21) Appl. No.: 09/853,535

(22) Filed: May 11, 2001

(65) Prior Publication Data

US 2001/0043013 A1 Nov. 22, 2001

(30) Foreign Application Priority Data

May 18, 2000 (JP) ........................................ 2000-146834

(51) Int. Cl.[7] .................................................. H02J 7/00
(52) U.S. Cl. ........................................................ 307/66
(58) Field of Search ............................. 307/46, 66, 67, 307/80, 85; 320/135

(56) References Cited

U.S. PATENT DOCUMENTS 5,332,927 A * 7/1994 Paul et al. ..................... 307/66
6,215,202 B1 * 4/2001 Luongo et al. ................ 307/64
6,487,096 B1 * 11/2002 Gilbreth et al. ................ 363/35
6,577,103 B2 * 6/2003 Tanaka et al. ................ 320/116

OTHER PUBLICATIONS

U.S. patent application Ser. No. 09/815,963, Tanaka et al., filed Mar. 23, 2001.

* cited by examiner

*Primary Examiner*—Gregory J. Toatley, Jr.
(74) *Attorney, Agent, or Firm*—Burr & Brown

(57) ABSTRACT

A high temperature secondary battery based energy storage and power compensation system wherein, an electric power supply system, electric load, and electric energy storage system including a high temperature secondary battery and power conversion system, are electrically connected with one another. When operating normally, electric power is supplied from the electric power supply system to the electric load, while the electric energy storage system operates to effect peak shaving and load leveling. A high speed switch is provided between the electric power supply system and the electric energy storage system, so that when a voltage sag or service interruption occurs while electric power is being supplied from the electric power supply system, the voltage sag is immediately detected and the switch is immediately opened, and electric power is immediately supplied from the electric energy storage system to the electric load to compensate for the voltage sag or service interruption.

6 Claims, 8 Drawing Sheets

ELECTRIC POWER QUALITY STABILIZATION

[ACTIVE POWER +
 REACTIVE POWER HIGH SPEED CONTROL]

HIGH-TEMPERATURE SECONDARY BATTERY BASED ENERGY STORAGE AND POWER COMPENSATION SYSTEM

BACKGROUND OF THE INVENTION

1. Field of the Invention

The present invention relates to a high-temperature secondary battery based energy storage and power compensation system.

2. Description of the Related Art

Conventionally, various energy storage systems for carrying out a peak shaving function as well as a load leveling function have been proposed. Although the proposed systems have been put into practical use in pumped storage hydro, none of the proposed systems has a power compensation function for compensating for a voltage sag or a service interruption, all of which are likely to happen suddenly in power supply systems.

Various electric power quality stabilizing apparatus formed by using semiconductor electric power conversion apparatuses capable of inhibiting harmonic distortion as well as voltage fluctuations have also been proposed. In fact, these electric power quality stabilizing apparatuses have been practically used in active filters and static Var compensator(SVC). Furthermore, to compensate for voltage sag and service interruption, UPSs have been proposed and have already been put into practical use. However, none of the apparatuses mentioned above has a peak shaving function or a load leveling function.

SUMMARY OF THE INVENTION

The present invention relates to a system which solves the above problems. It is an object of the present invention to provide an economical, high-temperature secondary battery based energy storage and power compensation system which has a peak shaving function and a load leveling function, as well as an electric power quality stabilizing function.

According to the present invention, there is provided a high-temperature secondary battery based energy storage and power compensation system, comprising an electric power supply system, an electric load, and an electric energy storage system including a high-temperature secondary battery and a power conversion system (PCS).

In the preferred embodiment, the electric power supply system, the electric load and the electric energy storage system are electrically connected, and when operating normally, electric power is supplied to the electric load while the electric energy storage system operates to effect peak shaving running and load leveling running.

In addition, a high speed switch is provided between the electric power supply system and the electric energy storage system such that when a voltage sag or a service interruption occurs in the electric power being supplied from the electric power supply system, the voltage sag is immediately detected, the circuit is temporarily shut off and electric power is immediately supplied from the electric energy storage system to the electric load in order to compensate for the voltage sag or the service interruption.

Further, according to the present invention, the high temperature secondary battery is preferably a sodium sulfur battery.

Moreover, in the preferred embodiment the energy storage system compensating for a voltage sag or a service interruption is a system capable of outputting a compensation electric power which is 3 to 8 times the rated electric power of the peak shaving running and the load leveling running.

In addition, according to the present invention, it is preferred that a back-up generator is connected to a circuit on the electric power compensation side of the high speed switch. Additionally, a voltage compensation controller is provided which is capable of detecting a circuit shut-down effected by the high speed switch, sending a command in accordance with the detection signal to cause the energy storage system to discharge electric power required by the load, and at the same time starting the back-up generator. Thereby if the electric power supply is not restored within a predetermined time period, the back-up generator is connected in parallel with the system, while at the same time the electric power supply from the energy storage system is stopped.

Furthermore, according to the present invention, it is preferred that an electric power supply system further comprises a control function capable of coping with a fluctuation derived from an accident such as a spike or a frequency fluctuation in the electric power by detecting immediately such an accident, and sending a signal based on detection to the electric energy storage system in order to compensate for the fluctuation.

Moreover, according to the present invention, it is preferred that spare high-temperature batteries connected in parallel with the module batteries are provided so as to compensate by switching module batteries to the spare batteries in a case when the module batteries fail.

DESCRIPTION OF THE PREFERRED EMBODIMENTS

The present invention will be explained in detail by referring to the embodiments described below. However, it is to be understood that the invention is not limited to these embodiments.

At first, the invention will be described in accordance with FIG. 1 which represents one embodiment of the present invention.

Figure 1:
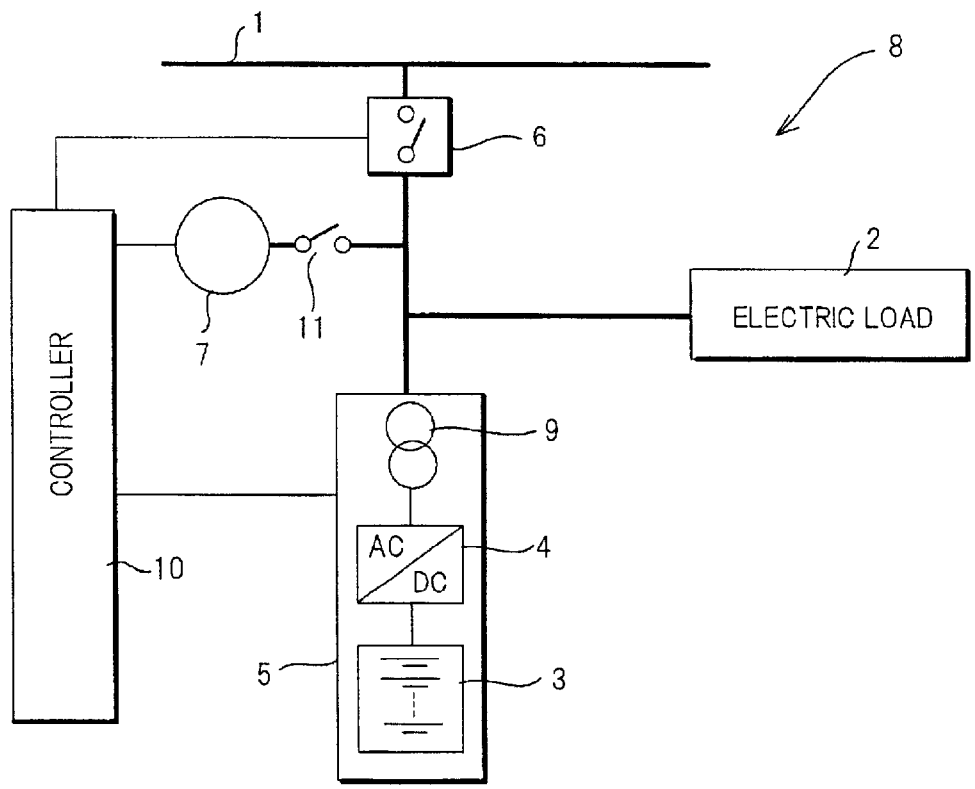
FIG. 1 is a schematic view showing one embodiment of the high temperature secondary battery based energy storage and power compensation system formed according to the present invention.

FIG. 1 shows a high-temperature secondary battery based energy storage and power compensation system. As shown in the drawing, the energy storage and power compensation system comprises an electric power supply system 1, a load 2, and an energy storage system 5, which are all electrically connected to one another. The energy storage system 5 includes a high-temperature secondary battery 3 and a PCS 4. A high speed switch 6 is provided in the circuit between the electric power supply system 1 and the electric energy storage system 5. Further, in a circuit formed between the high speed switch 6 and the load 2, a high temperature secondary battery based energy storage and power compensation system 8 equipped with a back-up generator 7 is provided. A transformer 9 is provided on the AC side of the PCS 4, while a circuit breaker 11 is provided in connection with the back-up generator 7.

Figure 2:
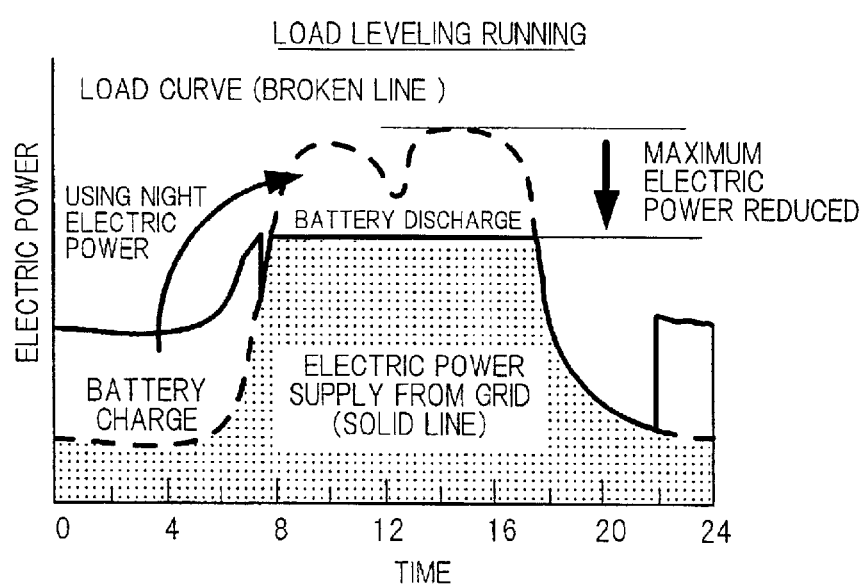
FIG. 2 is a graph showing the load leveling running effected by using the energy storage system of the present invention.

The high-temperature secondary battery based energy storage and power compensation system 8, which is constructed in accordance with the present invention, is usually employed to supply electric power from the electric power supply system 1 to the load 2. On the other hand, as shown in the graph of FIG. 2, the energy storage system 5 is operated in order to charge the high temperature secondary battery 3 with electric power at night, that is during the period from 10 PM to 7 AM. In this way, it is possible to perform so-called load leveling running in which the stored electricity can be discharged during the day time when a relatively large amount of electricity is required, as well as so-called peak shaving running in which the stored electricity can be discharged during the period from 1 PM to 3 PM in summer when a relatively large amount of electricity is required.

In FIG. 2, the broken line shows the load curve during one day, and the solid line shows the electric power supply from the grid during one day. During the period of 10 PM to 7 AM, some of the electric power is used to charge a sodium sulfur battery 3 in the electric energy storage system 5. Conversely, during the period from 8 AM to 6 PM, an amount of the stored electricity is discharged from the electric energy storage system 5 in order to meet the demands corresponding to the increased electric load during this period of time. Therefore, the maximum amount of electric power supplied by the electric power supply system can be reduced.

The sodium sulfur battery which is used as a high-temperature secondary battery not only has a high density and a long usable lifetime, but also can produce a high output within a short time period and has a high speed response. Furthermore, the electric energy storage system using the sodium sulfur battery can be fully automated. Moreover, since the electric energy storage system 5 is completely sealed, maintenance is easy. The electric energy storage and power compensation system 8 according to the present invention is characterized in that it uses a sodium sulfur battery. However, such a high-temperature secondary battery may also be a sodium.metal chloride battery.

Usually, whenever a voltage sag in the electric power being supplied from the electric power supply system 1 or a service interruption occurs, there is an adverse effect on the electric load 2. In particular, when the electric load 2 is an important piece of production equipment controlled by computer, such a momentary voltage drop can cause considerable damage to the production system.

A back-up generator is usually provided in an electric power supply circuit in order to properly deal with a situation in which a voltage sag or a service interruption occurs. However, a problem still exists in that at least 10 seconds are required for the back-up generator to start supplying the necessary electric power to the electric load to compensate for the sag or interruption.

Figure 3:
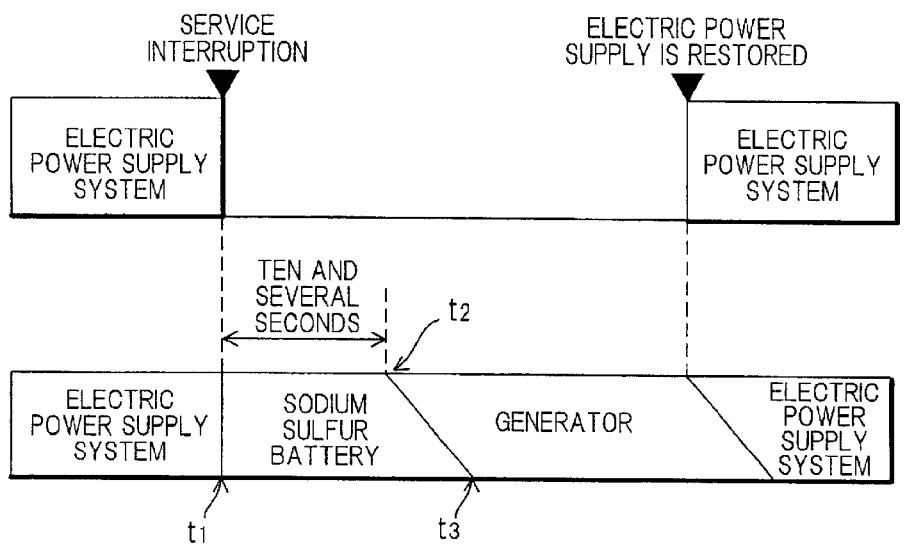
FIG. 3 is a graphic showing how a voltage sag is prevented when the service interruption occurs in an electric power supply system by using the high-temperature secondary battery based energy storage and power compensation system formed according to the present invention.

The high temperature secondary battery based energy storage and power compensation system 8 according to the present invention is formed so that it can operate in the manner shown in FIG. 3. Namely, whenever there is a voltage sag in the electric power being supplied from the electric power supply system 1 or a service interruption occurs, the high speed switch 6 will operate to immediately disconnect the electric power supply system from the load, while at the same time providing temporary, full electric energy to the load from the electric energy storage system 5. Meanwhile, the generator is started, and there is an interval of about fifteen seconds before the entire load is shifted to the generator. The interval of about fifteen seconds can be compensated for by an electric power output from the electric energy storage system 5 utilizing the sodium sulfur battery.

As shown in FIG. 3, the high speed switch 6 operates at time $t_1$ to disconnect the electric power supply system from the load, and the electric energy storage system 5 utilizing the sodium sulfur battery will immediately start to supply electric power to the load, and at the same time, the generator is started. Then, about fifteen seconds later, i.e., at $t_2$, the generator 7 is fully operational and the circuit breaker is closed to connect the generator to the load. Afterwards, at $t_3$, the shift from the sodium sulfur battery to the generator is complete, thereby ending the electric discharge from the electric energy storage system 5.

On the other hand, in the case where a power compensation is needed only for a voltage sag, it is not necessary to use the back-up generator 7.

A semiconductor switch is preferably used as the high speed shut-off switch 6. This is because, whenever there is a voltage sag, the semiconductor switch can immediately disconnect the circuit and thus exhibits an excellent high speed response. If the circuit does not disconnect immediately, the electric power discharged from the energy storage system 5 utilizing a sodium sulfur battery having an excellent high speed response will undesirably flow back to the power supply system, rending it impossible to supply the required electric power to the load.

Figure 4:
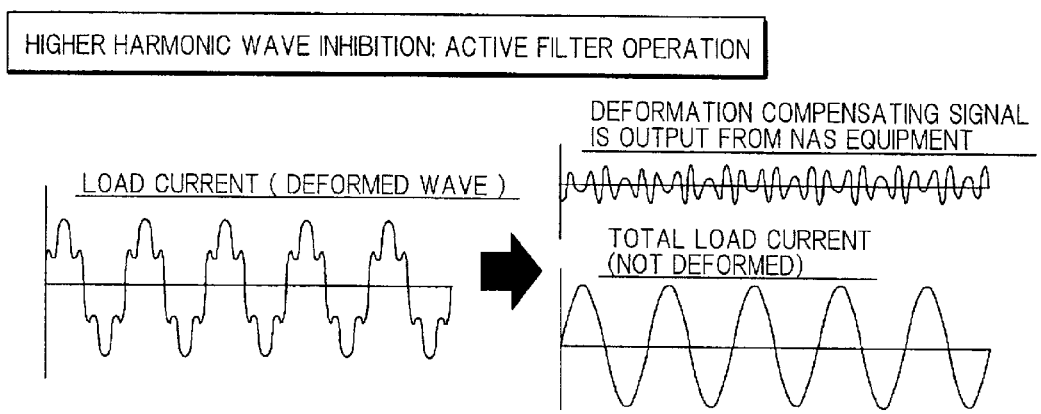
FIG. 4 is a graph showing how a load current having a deformed wave is compensated for in an electric power supply system by using the high temperature secondary battery based energy storage and power compensation system formed according to the present invention.

Furthermore, it is possible to make use of the sodium sulfur battery system having a PCS. Namely, as shown in FIG. 4, the load current having a deformed wave can be improved to an overall load current without any distortion by virtue of a distortion compensation output from the energy storage system 5 utilizing the sodium sulfur battery.

As described in the above, the energy storage and power compensation system 8 according to the present invention can, under normal operation, perform load leveling as well as peak shaving. Meanwhile, the energy storage and power compensation system can instantly compensate for an entire electric load whenever there is a voltage sag or when a service interruption occurs, thereby protecting an important load or manufacturing system from severe damage. In addition, it is also possible to stabilize the quality of an electric power at each terminal of the system, as well as to effect an SVC running.

Figure 5:
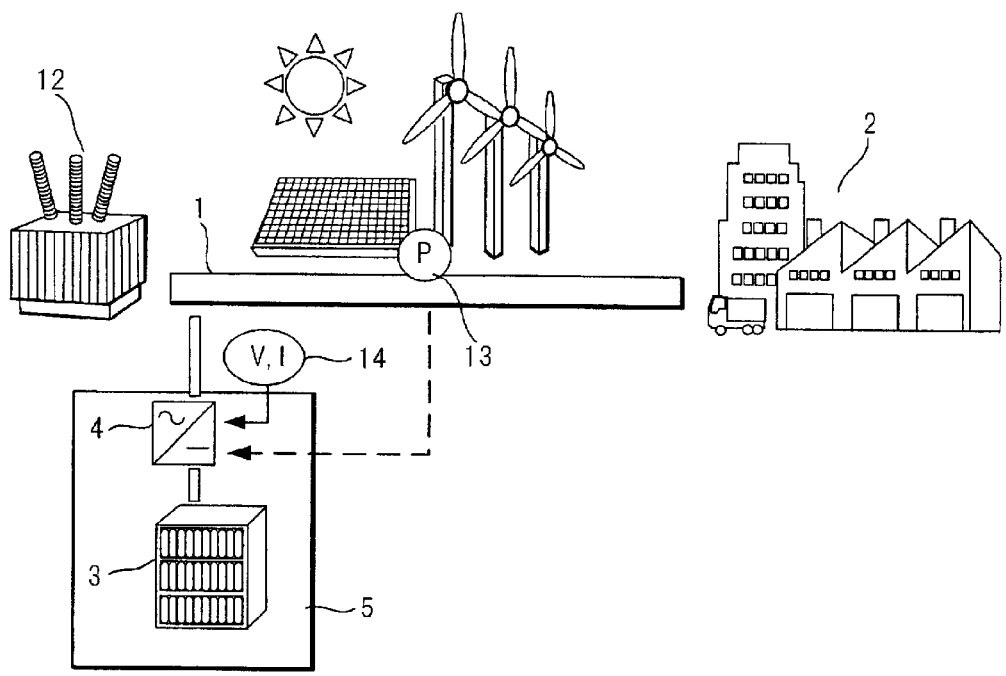
FIG. 5 is a schematic view showing an example of another embodiment of the high-temperature secondary battery based energy storage and power compensation system formed according to the present invention.

FIG. 5 is used to indicate one example of another embodiment for carrying out the present invention.

When electricity generating equipment 13 using renewable energy is provided in an electric power supply system located between a distribution substation 12 and an electric power user 2, the energy storage and power compensation system 8 formed according to the present invention can be operated to compensate for an output fluctuation of the generator 13.

That is, this embodiment is directed to an energy storage and power compensation system comprising an electric power supply system 1, and an electric energy storage system 5 connected with said supply system and consisting of a sodium sulfur battery 3 and a PCS 4. Additionally, an electric power compensation controller 14 is provided between the electricity generating equipment 13 and the electric energy storage system 5. This controller is capable of detecting an output from the generator 13 and outputting a signal to supply electric power from the energy storage system 5 for compensating the output of the electricity generating equipment.

Thus, the electric energy storage system 5 is capable of not only performing load leveling and peak shaving, but also absorbing output fluctuations derived from variations in nature of the electricity generating equipment 13 involving the use of renewable energy resources.

Figure 6:
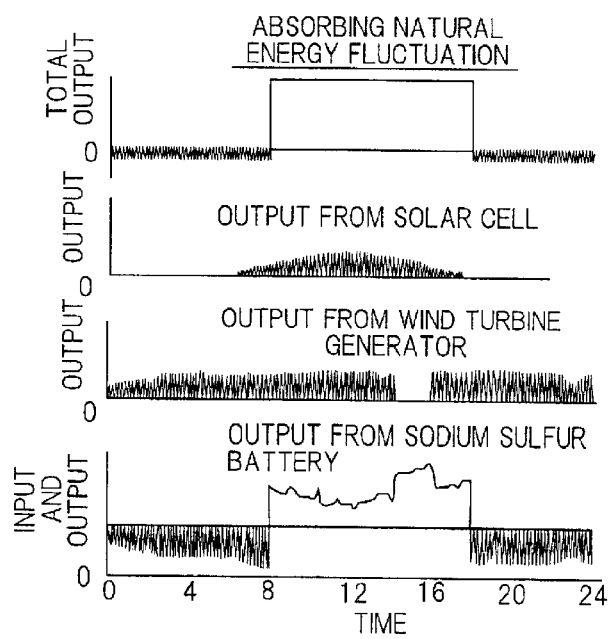
FIG. 6 is a graph showing how an output fluctuation of an electric power generated by a renewable energy is compensated for, by using the high temperature secondary battery based energy storage and power compensation system formed according to the present invention.

FIG. 6 shows an example wherein an output fluctuation of the electricity generating equipment 13 equipped with a solar cell and a wind turbine generator is compensated by outputting power from the energy storage system 5 based on a signal from the electric power compensation controller 14 so as to compensate for the fluctuations during the period of from 8 AM to 6 PM.

Figure 7:
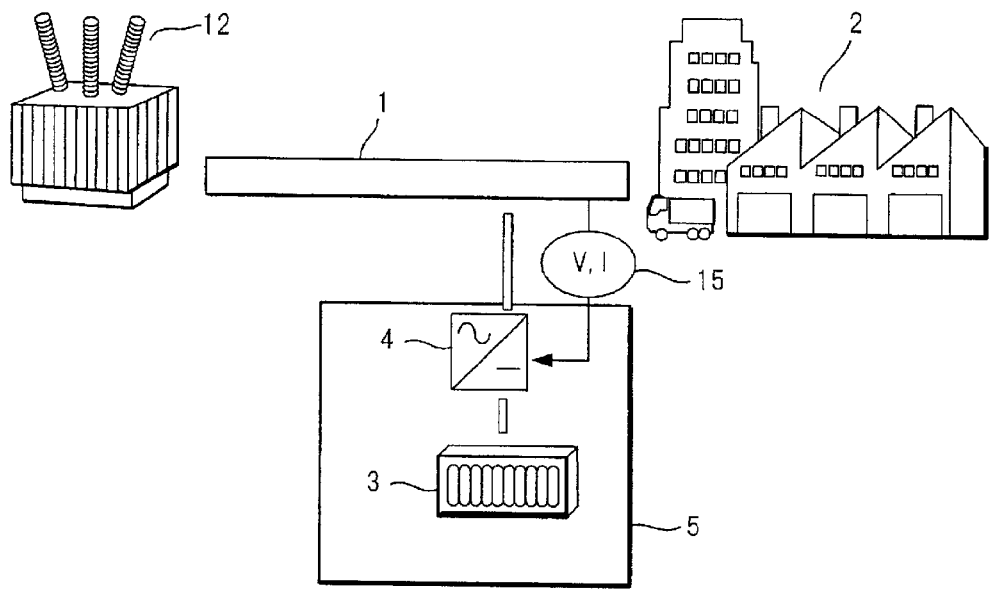
FIG. 7 is an explanatory view schematically showing an example of another embodiment of the high temperature secondary battery based energy storage and power compensation system formed according to the present invention.

FIG. 7 shows an example of a further embodiment for carrying out the present invention.

The energy storage and power compensation system 8 according to this embodiment of the present invention comprises an electric energy storage system 5 consisting of a sodium sulfur battery 3 and a PCS 4 provided in a power supply system 1 which extends between the distribution substation 12 and the electric load 2. This embodiment is further characterized in that an electric power quality stabilizing controller 15 capable of detecting the voltage, current, and frequency of the electric power supplied from the power supply system 1 is provided between the electric power supply system 1 and the electric energy storage system 5. The stabilizing controller 15 is capable of outputting power in proportion to deflections of the above parameters from the energy storage system 5, in accordance with detection signals.

Thus, the electric energy storage system 5 is capable of performing not only load leveling and peak shaving, but also stabilizing operations in proportion to the electric power fluctuation. Therefore, it is possible to effect a desired compensation to ensure stabilized power supply.

Figure 8:
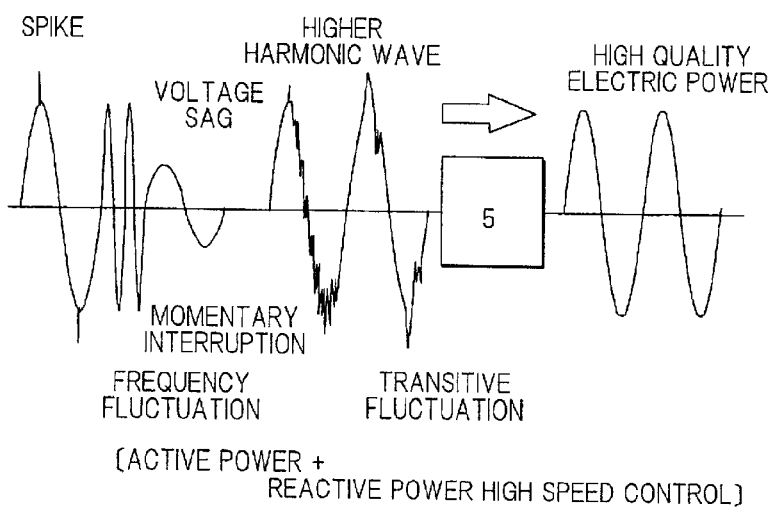
FIG. 8 is a graph showing how an output fluctuation of an electric power sent from a power supply system is compensated for by using the high temperature secondary battery based energy storage and power compensation system formed according to the present invention.

FIG. 8 shows an example in which the controller operates to provide compensating electric power from the energy storage system 5, so as to compensate for various fluctuations of electric power flowing from the electric power system 1, thereby ensuring a high quality electric power supply.

Examples of the present invention will be described in the following.

EXAMPLE 1

Figure 9:
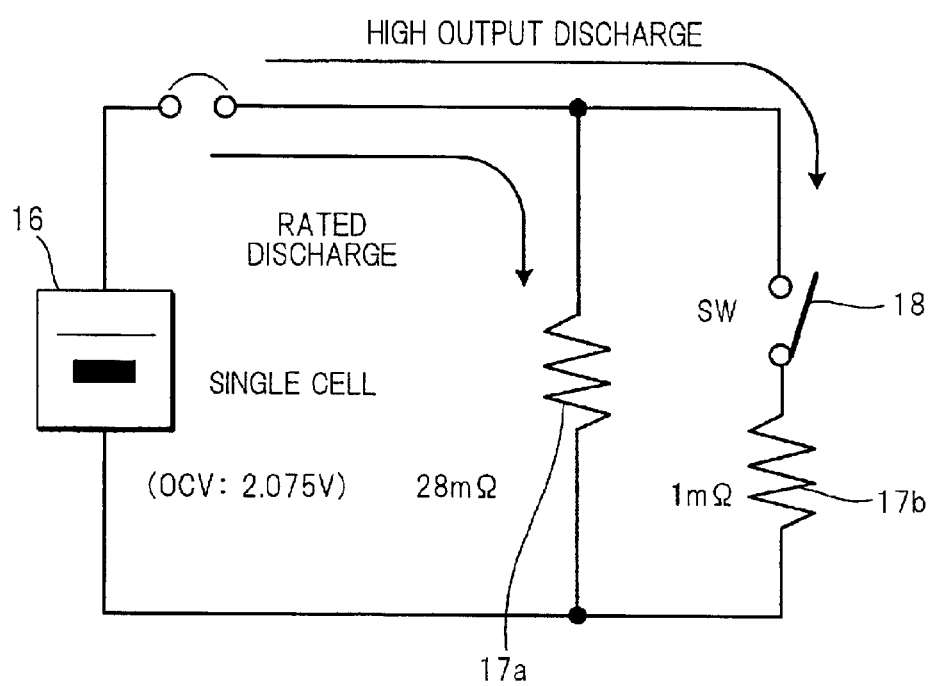
FIG. 9 is a circuit diagram demonstrating a short-time high-output function of a sodium sulfur battery.

FIG. 9 shows a short-time high-output function of the sodium sulfur battery.

Figure 10:
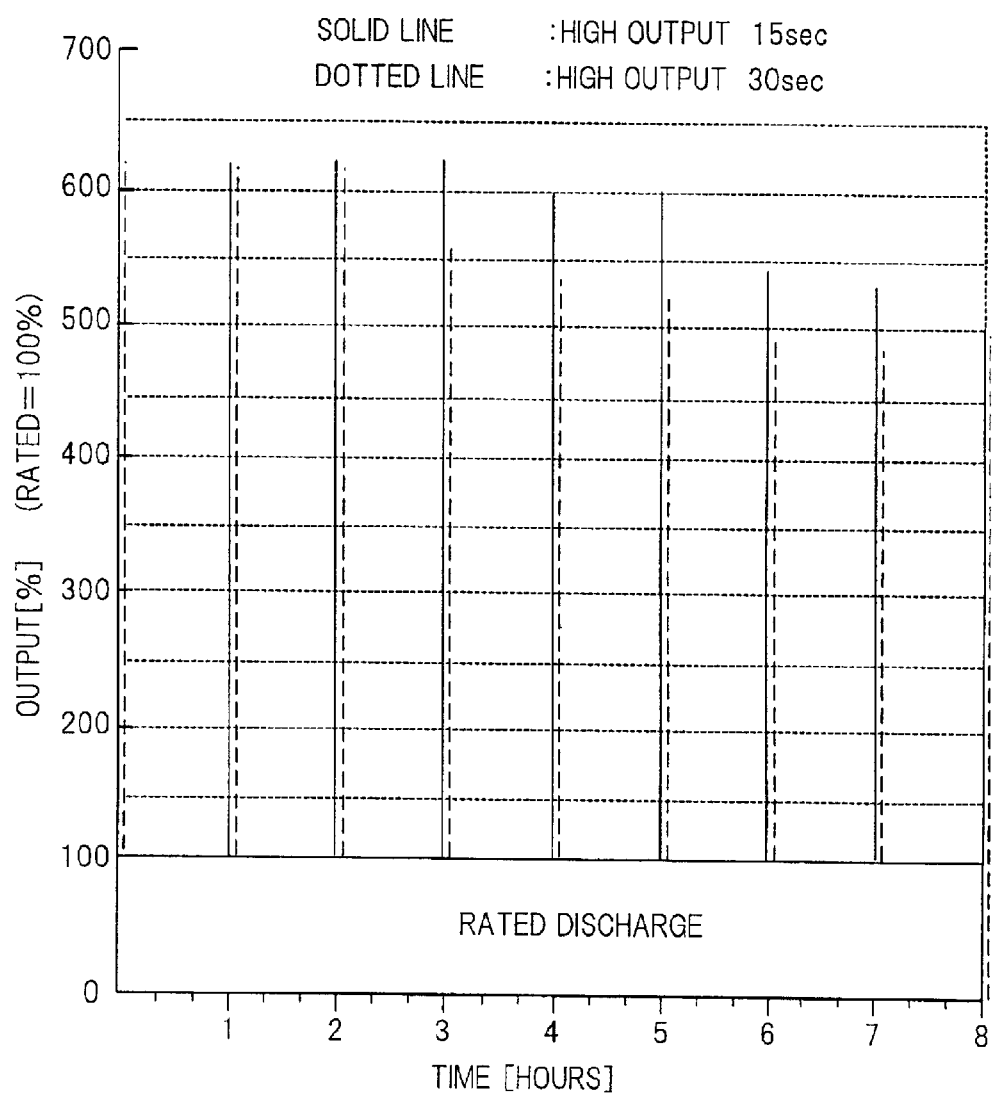
FIG. 10 is a graph showing a short-time high-output characteristic of the sodium sulfur battery.

A sodium sulfur single cell battery (open-circuit voltage 2.075 V), a 28-mΩ resistor 17a, a 1-mΩ resistor 17b, and a switch 18 are connected in the manner shown in FIG. 9, thereby forming a predetermined circuit. A rated discharge is performed through the 28-mΩ resistor 17a, the switch 18 is opened or closed so as to effect a short-time high-output discharge through the 1-mΩ resistor 17b. FIG. 10 (which is a graph) shows the result obtained when a high output discharge is repeated every hour during the rated discharge.

As shown in the graph, during 15 and 30 second outputs, it is possible to effect a discharge which is about 5 to 6 times greater than the rated current (for eight hours). Namely, the sodium sulfur battery based energy storage and power compensation system formed according to the present invention is characterized in that it employs the above described sodium sulfur battery forming a system capable of performing load leveling, as well as providing the function of preventing an instantaneous voltage drop.

EXAMPLE 2

Figure 11:
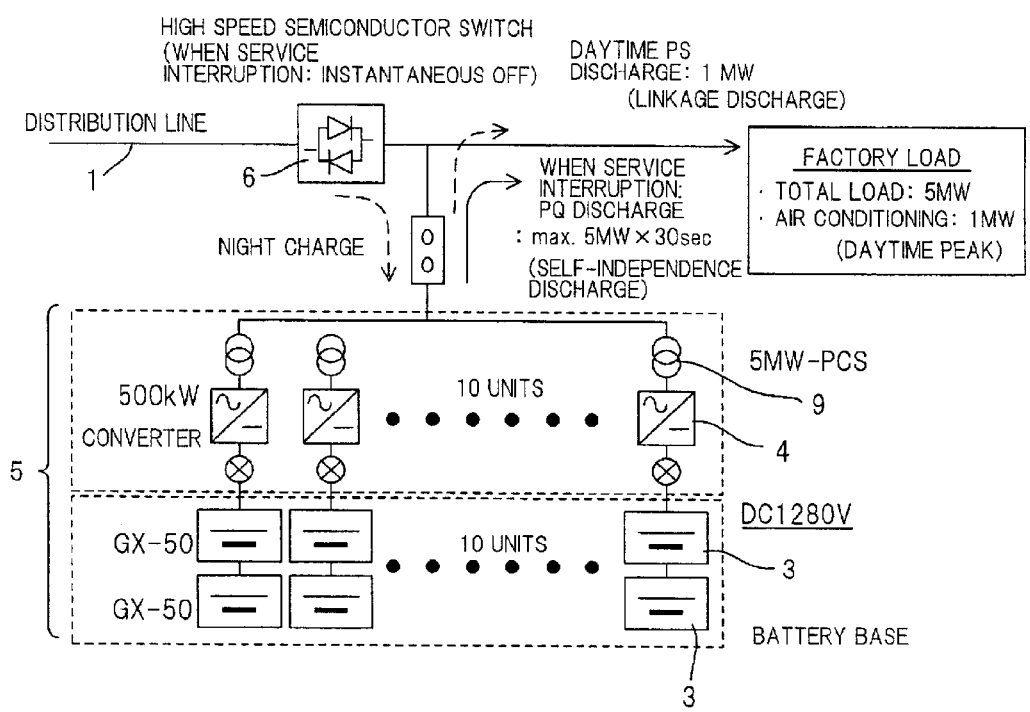
FIG. 11 is an explanatory view showing in detail an example in which the high-temperature secondary battery based energy storage and power compensation system formed according to the present invention is used in an electric load (factory).

FIG. 11 shows in detail an example in which the sodium sulfur battery based energy storage and power compensation system 8 formed according to the present invention can be used in an electric load (factory) having a total load of 5 MW.

A energy storage system 5 including ten units of 500 KW PCSs 4 and sodium sulfur batteries 3 is electrically connected to a high speed semiconductor switch 6, an electric power supply system 1 and a factory load, in the manner shown in FIG. 11. Under normal operation, the energy storage system 5 receives at night an electric charge from the electric power supply system 1. However, during the daytime when there is an increased need for electric power due to a heavier electric load created by the use of air conditioning equipment and air conditioners, the energy storage system 5 discharges 1 MW electric power, thereby providing load leveling.

When there is a voltage sag or a service interruption, the high speed switch 6 operates to immediately disconnect the electric power supply system, while at the same time an electric power of 5 MW is spontaneously discharged from the energy storage system 5 within 30 seconds, thereby ensuring power is supplied having stabilized quality without any voltage drop, until the service interruption is over and the ordinary power supply has been restored.

In FIG. 11, the discharge is indicated as a PQ discharge (Power Quality discharge). In the case where there is a back-up generator (not shown), 30 seconds would be sufficient to bridge the power source from the energy storage system to the back-up generator. Accordingly, even if the service interruption period is relatively long, it is still possible to supply electric power to the electric load (factory) having a high and stabilized quality.

Figure 12:
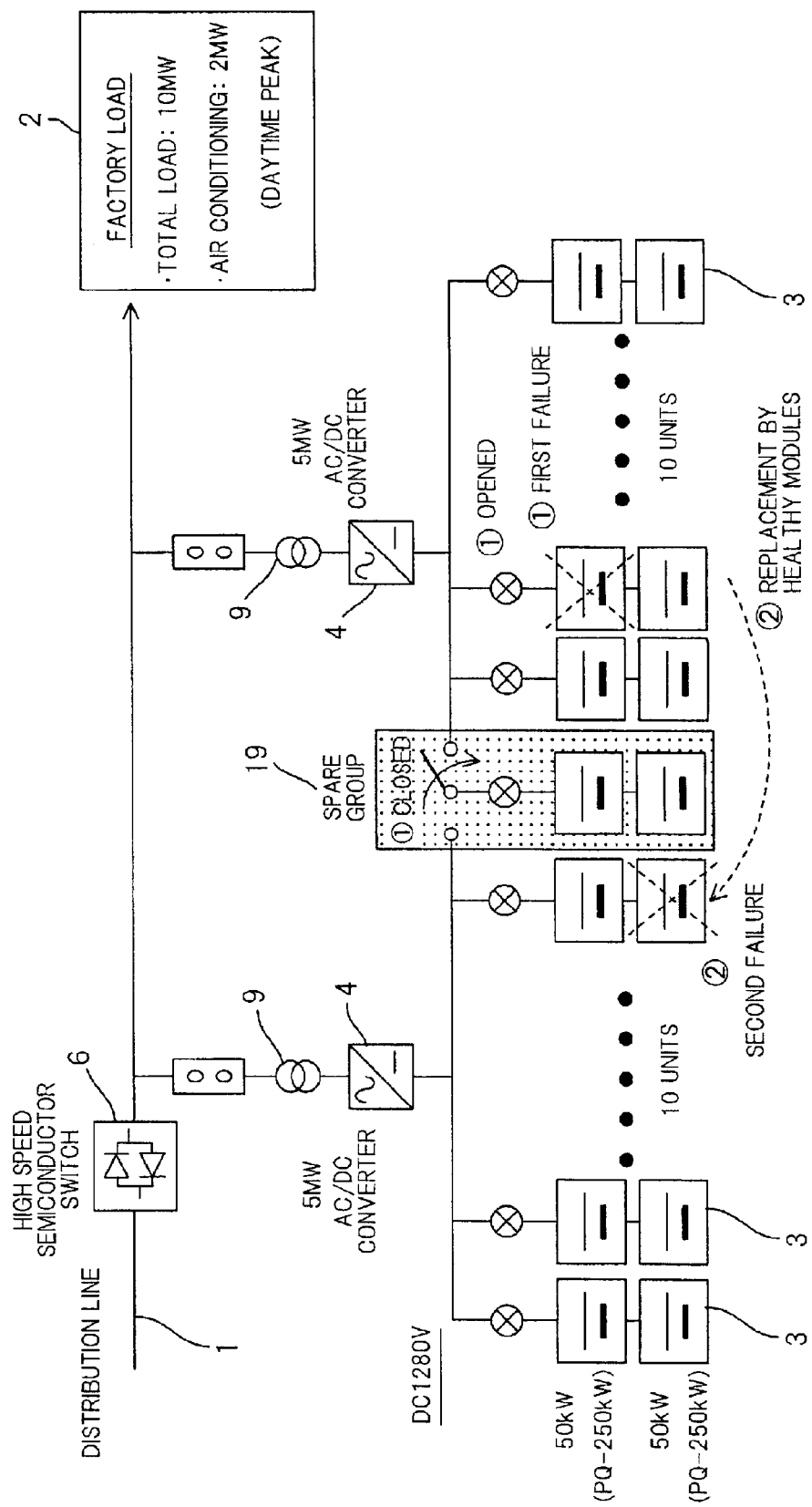
FIG. 12 is an explanatory view showing in detail an example in which the high-temperature secondary battery based energy storage and power compensation system formed according to the present invention and including spare batteries are used in an electric load (factory).

FIG. 12 shows in detail an example in which a group of spare batteries 19 are arranged for use with a high-temperature battery system of the present invention, which is provided for an electric load having a total load of 10 MW. If, in the event of an accident, a module battery 3 has a failure, the failed group is disconnected while the spare group 19 is connected in parallel to the circuit, thereby improving the reliability for supplying electric power. In such a case, since each group includes 2 module batteries 3, if the system is used for a long time, and the second battery also fails, a healthy module battery of the failed group can be used to replace the second failed battery. In this way, it is possible for the system to run for an extremely long time, ensuring improved reliability.

As may be understood from the above description, the high-temperature secondary battery based energy storage and power compensation system formed according to the. present invention, is a system capable of performing peak shaving as well as load leveling, thereby ensuring an improved, stable, and high quality electric power supply. Therefore, the energy storage and power compensation system of the present invention is suitable not only for effectively making use of the electric power in the night time, but is also suitable for supplying high quality electric power to a factory or like facility. Further, the energy storage and power compensation system of the present invention is capable of preventing a voltage sag in important equipment, stabilizing an output electric power generated by fluctuating renewable energy, and compensating for voltage and current spikes, frequency fluctuations and harmonic distortions.

What is claimed is:

1. A high-temperature secondary battery based energy storage and power compensation system, comprising:

an A.C. electric power supply system;

an electric load;

an electric energy storage system including a high-temperature secondary battery and a power conversion system, wherein the electric power supply system, the electric load and the electric energy storage system are electrically connected, and from which, when operating normally, A.C. electric power is supplied directly from the electric power supply system to the electric load while the electric energy storage system operates to effect peak shaving and load leveling and a high speed switch provided between the electric power supply system and the electric energy storage system;

wherein, when a voltage sag or a service interruption occurs in the electric power being supplied to the electric load from the electric power supply system, the voltage sag is immediately detected, the high speed switch is temporarily opened and electric power is immediately supplied from the electric energy storage system to the electric load in order to compensate for the voltage sag or the service interruption.

2. A high-temperature secondary battery based energy storage and power compensation system according to claim 1, wherein the high-temperature secondary battery comprises a sodium sulfur battery.

3. A high-temperature secondary battery based energy storage and power compensation system according to claim 1, wherein the electric energy storage system for compensating for the voltage sag or the service interruption is a system capable of outputting a compensation electric power which is 3 to 8 times a rated electric power of the electric energy storage system during peak shaving and load leveling.

4. A high-temperature secondary battery based energy storage and power compensation system according to claim 1, further comprising:

a back-up generator connected on the electric power compensation side of the high speed switch;

a voltage compensation controller capable of detecting when the high speed switch is opened, and sending a command in accordance with a detection signal to cause the electric energy storage system to discharge an entire electric load, and, at the same time, starting the back-up generator, so that if the electric power supply is not restored within a predetermined time period, the back-up generator is connected in parallel with the system, while at the same time the electric power supply from the electric energy storage system is stopped.

5. A high-temperature secondary battery based energy storage and power compensation system comprising the electric power supply system, the electric load, and the electric energy storage system including the high-temperature secondary battery and a power conversion system, all of which are electrically connected with one another so as to supply an electric power from the electric power supply system to the electric load under normal operation conditions, and operating the electric energy storage system in order to effect peak shaving and load leveling according to claim 1, wherein said system further comprises a control function capable of coping with a fluctuation derived from an event such as a spike and a frequency fluctuation in the electric power supplied, by detecting immediately such an event, and sending a signal based on detection to the electric energy storage system in order to compensate for the fluctuation.

6. A high-temperature secondary battery based energy storage and power compensation system according to claim 1, wherein spare high temperature batteries connected in parallel with module high temperature batteries are provided so as to cope with a case that module batteries fail, by switching from failed module batteries to the spare high temperature batteries.

* * * * *